United States Patent
Baxter

(10) Patent No.: US 6,837,820 B1
(45) Date of Patent: Jan. 4, 2005

(54) DIFFERENTIAL DRIVE GEAR ASSEMBLY

(75) Inventor: Ralph Woodward Baxter, Fort Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 09/794,406

(22) Filed: Feb. 28, 2001

(51) Int. Cl.[7] .............................................. F16H 48/06
(52) U.S. Cl. ....................................................... 475/220
(58) Field of Search ........................ 475/220; 74/606 R, 74/607

(56) References Cited

U.S. PATENT DOCUMENTS

| | | | |
|---|---|---|---|
| 2,936,035 A | 5/1960 | Hill | |
| 4,077,279 A | 3/1978 | Goscenski, Jr. | |
| 4,108,021 A | 8/1978 | MacAfee et al. | |
| 4,480,500 A | 11/1984 | Yamamori et al. | |
| 4,631,978 A | 12/1986 | Teraoka | |
| 4,907,669 A | 3/1990 | Cameron et al. | |
| 4,915,191 A | 4/1990 | Kotajima | |
| 5,135,071 A | 8/1992 | Shibahata et al. | |

*Primary Examiner*—Dirk Wright
(74) *Attorney, Agent, or Firm*—Liniak, Berenato & White

(57) ABSTRACT

A differential drive gear assembly including a differential case driven by a transmission allowing differential rotation between a pair of output axle shafts and facilitating a driving connection to a power take-off unit. The differential case has gear teeth directly formed thereon along an outer peripheral surface. The differential case gear teeth engage a power take off gear to drive an auxiliary device. In the preferred embodiment, the power take of device is a second drive shaft for driving a second axle assembly. Such an arrangement facilitates a simple conversion from an existing two-wheel drive design to a four-wheel drive assembly.

9 Claims, 2 Drawing Sheets

DIFFERENTIAL DRIVE GEAR ASSEMBLY

FIELD OF THE INVENTION

The present invention relates to a differential drive gear assembly and more particularly to an assembly having a differential case having external teeth formed directly on peripheral surface of the differential case for driving a gear of a power take off device.

DESCRIPTION OF THE PRIOR ART

Four-wheel drive transmissions are well known in the art. Typically, power is transmitted from a transmission to a transfer case to selectively transmit power to front and rear axle assemblies. Much design effort is needed in the placement of the transfer case in the vehicle and the interface with the transmission and power delivery to the front and rear axle assemblies. Moreover, the transfer case itself is a complicated and expensive gear assembly. Modifying an existing two wheel drive vehicle to a four wheel drive vehicle contemplates many factors such as the location of the transfer case, and the reconfiguration of the existing front or rear axle assembly as the two wheel drive assembly is designed to be directly driven by the transmission.

Also known in the art is a conventional final gear train of a transaxle for a front engine front driven automobile, a differential case is rotatably mounted within a housing portion of the transmission case by two bearings. The differential case has a main body portion driven by a gear assembly extending from the transmission. The differential case has a gear-assembly disposed therein to allow for differential rotation of a pair of front axle shafts. Such a differential assembly is well known in the art.

The need therefore exists for a simple modification to a conventional differential assembly to allow power take-off from the existing axle assembly for driving a second drive axle assembly or other auxiliary device.

SUMMARY OF THE INVENTION

The present invention is directed to a differential drive gear assembly. A differential assembly includes a differential case driven by a transmission for facilitating differential rotation between a pair of output axle shafts. The differential case has gear teeth directly formed thereon along an outer peripheral surface. The differential case gear teeth engage a gear to drive a power take off unit. In the preferred embodiment, the power take of unit is a second drive shaft for driving a second axle assembly. Such an arrangement facilitates a simple modification from an existing two-wheel drive design to a four-wheel drive assembly.

DETAILED DESCRIPTION OF THE PREFERRED EMBODIMENT

Figure 1:
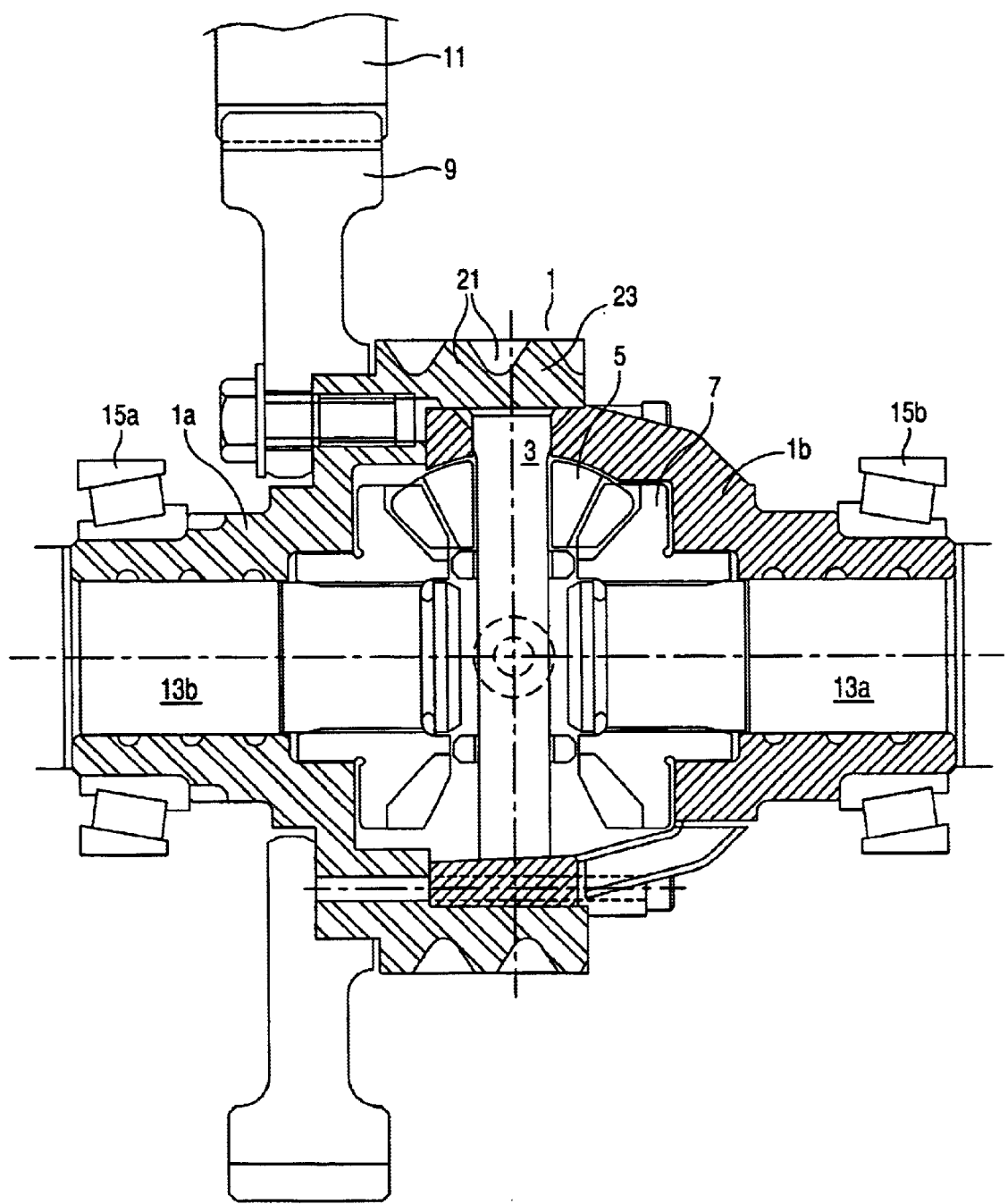
FIG. 1 is a partial sectional view of an axle assembly with gear teeth formed directly on the differential case.

Referring to FIG. 1, a differential case 1 which has mounted therein a pinion assembly including a pinion shaft 3 extending through the differential case 1. A pair of pinion 5 gears are rotatably mounted to the pinion shaft 3 and engage a pair of side gears 7 respectively. The ring gear 9 meshes with an idler/transmission gear 11 which is driven by a transmission (not shown). The side gears 5 mounted within differential case 1 are attached to a pair of front axle shafts 13a, 13b respectively. These shafts 13a, 13b extend, in the opposite directions, outwardly after passing through apertures cylindrical portions formed at both axial end sides of the differential case 1. With two bearings 15a, 15b, the differential case 1 is rotatably mounted within a housing 17 extending from or formed with a transmission housing. Explaining in more detail, inner races of the bearings are fixedly attached to the cylinder portions of the differential case 1, and outer races of the bearings are fixedly attached go the bearing retainer and the transmission/differential housing 17, respectively, with balls or rollers disposed between the inner race and outer race and balls or rollers disposed between the inner race and outer race. The ring gear 9 is rotated by the idler/transmission gear 11 and rotates the differential case 1 and in turn the front axle shafts 13a, 13b via the pinions 5 and side gears 7. The pinions 5 rotate relatively to the side gears 7 depending upon a difference in load on the front axle shafts 13a, 13b thus serving as a differential mechanism allowing differential rotation speed between the front axle/output shafts 13a, 13b.

The differential case 1 is formed of two pieces which are simply bolted together as in a conventional arrangement. One main portion 1a of the differential case 1 is a unitary piece extending from the bearing and substantially enclosing the gear assembly disposed therein. The ring gear 9 is fastened to the main portion 1a via bolts or any pother suitable fashion known within the art. The ring gear 9 may be driven by a simple idler/transmission gear 11, or may be equipped with a hypoid gear to meshingly engage a pinion gear of a pinion shaft as is known with conventional differential assemblies. As the ring 9 gear is rotated, the differential case 1 rotates to differentially drive the front axle shafts 13a, 13b.

As can be seen from the embodiment of FIG. 1, the generic elements of the differential assembly are much like a conventional differential assembly. However, the main portion of the differential case 1a has gear teeth 21 formed directly along an outer peripheral surface located axially proximate the pinion gears 5. The type of gear teeth are preferably beveled gears to engage complimentary beveled gear teeth in the power take off assembly. However, simple straight gears, or hypoid gears are also possible and is contemplated by the present invention.

The gear teeth 21 are preferably cut directly into a flat portion 23 of the main portion 1a of the differential case 1a and are design to meshingly engage a gear 31 of a power take off assembly. As can be seen in FIG. 1 the gear teeth 21 are unitarily formed as part of the unitary main portion 1a of the differential case. Such an arrangement allows for simpler assembly of the overall axle assembly without the necessity to further attached the gear teeth.

Figure 2:
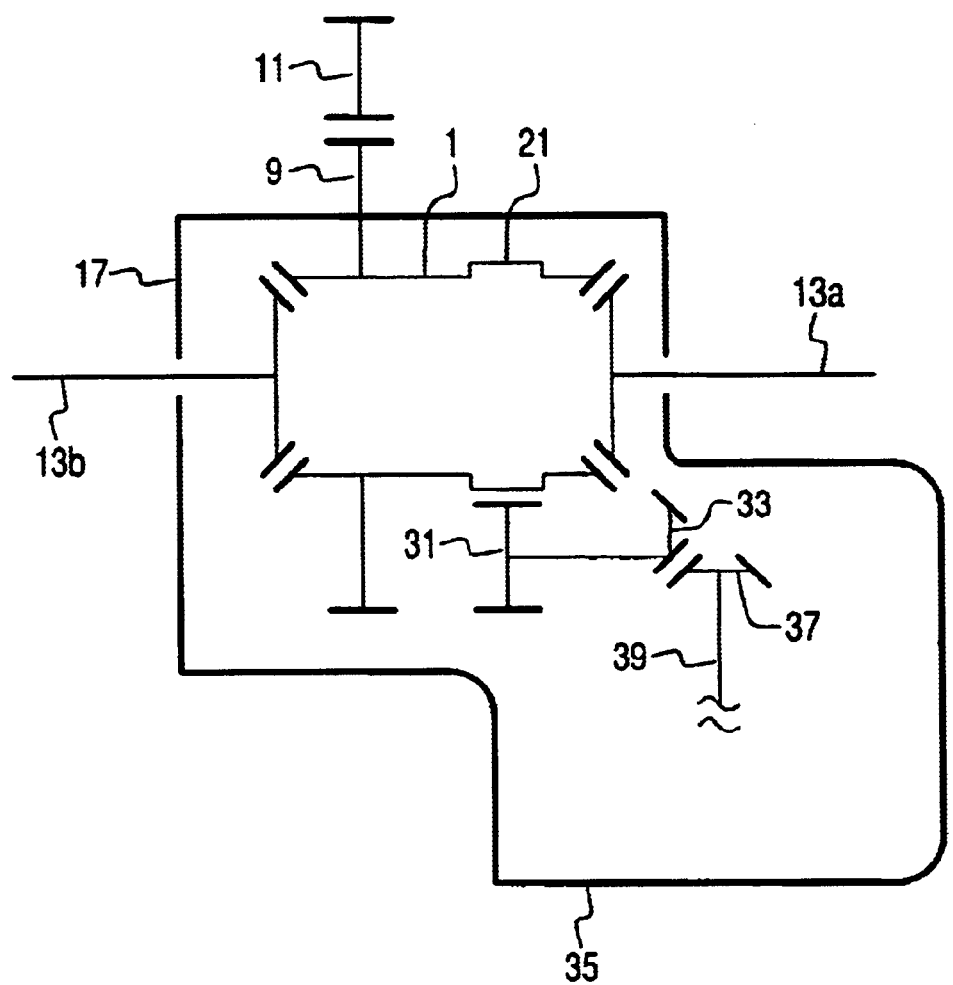
FIG. 2 is a schematic representation of the assembly of FIG. 1 with a power take off assembly.

FIG. 2 depicts a schematic representation of the differential gear assembly of the present invention coupled with a power take off gear assembly and driven by a gear 11 of a transmission. As in FIG. 1, a driving gear 11 of a transmission assembly (not shown) engages the ring gear 9 of the differential assembly. The differential housing 17 is modified to accommodate a power take off device and specifically a drive train to drive a supplemental axle assembly. A power take off gear 31 engages the gear teeth 21 of the differentia case 1. Therefore, as the differential case 1 rotates as driven by transmission gear 11, the power take of gear 21 is simultaneously driven. The power take off gear 21 is splined and bolted or otherwise secured to a second ring gear 33.

The power take off gear 31 and second ring gear 33 being rotatably supported in the modified second housing 35. The second ring gear 33 engages a pinion gear 37 of a supplemental drive shaft 39. The supplemental drive shaft 39 extends to either a second axle assembly to drive a rear axle and establish four wheel drive or may me applicable to drive an auxiliary device. The supplemental drive shaft 39 may simply lead to a conventional differential assembly to drive the rear axles as is known in the art.

Thus the present invention allows for simple modification of an existing two-wheel drive assembly to establish four-wheel drive. The differential case 1 of the present invention may be employed in conventional axle assemblies which do not have teeth so formed along the external peripheral surface. In conventional axle assemblies, removal of the housing cover exposes the differential case. Thus by simply replacing conventional differential cases with the differential case 1 of the present invention, removal of the housing covers exposes rotating teeth 21 that may be employed to drive a power take off device or supplemental axle assembly. Therefore, in one embodiment, only the cover and surrounding portion of the housing 17 need to be modified to incorporate a power take off device. A mating housing 35 having the power take off gearing need only be mounted proximate the housing 17 to allow a gear 31 to engage the teeth 21 formed in the differential case. Thus, as the differential case 1 is rotated by the conventional drive assembly, power may be delivered to another drive axle 39 or auxiliary device. Thus the present invention allows for simple modifications of two-wheel drive assemblies to incorporate a four-wheel drive design or otherwise incorporate an auxiliary power take off device.

While the foregoing invention has been shown and described with reference to a preferred embodiment, it will be understood by those possessing skill in the art that various changes and modifications may be made without departing from the spirit and scope of the invention. For example, while the present invention has been shown and described in reference to a power take off to drive a rear axle assembly, the present invention may be employed in conventional axle assemblies for driving any type of power take off unit for other applications.

What is claimed is:

1. An axle assembly comprising:

a first housing;

a differential case rotatably mounted within said housing, said differential case having a first ring gear secured thereto and engaging a transmission gear, said differential case containing a differential gear assembly adapted to allow differential rotational speed between a pair of opposing output shafts, said differential case having gear teeth formed directly on an outer surface thereof;

a power take off gear engaging said gear teeth formed directly on said differential case for driving an auxiliary device.

2. The axle gear assembly according to claim 1, wherein said gear teeth are formed in a first portion of said differential case, said ring gear being secured to said first portion, said first portion and said gear teeth being integrally formed as a unitary piece.

3. The axle assembly according to claim 1, wherein said gear teeth formed directly on said differential case are hypoid gear teeth.

4. The axle assembly according to claim 1, in combination with said auxiliary device, said auxiliary device having:

a second housing connected to said first housing and containing said power take off gear rotatably mounted therein, a second ring gear rotatably mounted within said second housing and fixed to said power take off gear for rotation therewith;

a supplemental shaft rotatably supported within said second housing and having a pinion gear mounted on one end thereon, said pinion gear engaging said second ring gear thereby establishing a driving connection between said differential case and said supplemental output shaft.

5. The axle according to claim 1, wherein said differential case is formed of a first main portion and a second portion bolted together, said first main portion and said second portion each being rotatably supported within said housing by a corresponding one of a pair of bearings, said first main portion extending to substantially enclose said differential gear assembly and having said gear teeth formed thereon, said first main portion and said gear teeth formed thereon being formed as a unitary piece.

6. The axle assembly according to claim 1, wherein said ring gear and said transmission gear are rotatably positioned substantially in a common plane and having a parallel axis of rotation.

7. An axle assembly comprising:

a first housing;

a differential case mounted within said first housing, said differential case having a first ring gear non-rotatably fixed thereto for engaging a transmission gear for driving said differential case, said differential case having gear teeth directly formed along an external peripheral surface thereof and unitarily formed with a first portion of said differential case;

a pair of bearings disposed between said differential case and said housing thereby forming a rotatable connected therebetween, said bearings located proximate opposite sides of said differential case; and a power take off gear engaging said gear teeth formed directly on said differential case for driving an auxiliary device;

a second housing portion connected to said first housing and containing said power take off gear rotatably mounted therein, a second ring gear rotatably mounted within said second housing and fixed to said power take off gear for rotation therewith; and a supplemental output shaft rotatably supported within said second housing and having a pinion gear mounted on one end thereon, said pinion gear engaging said second ring gear thereby establishing a driving connection between said differential case and said supplemental output shaft.

8. The assembly according to claim 7, wherein said gear teeth formed directly on said differential case are hypoid type gears.

9. The axle assembly according to claim 7, wherein said ring gear and said transmission gear are rotatably positioned substantially in a common plane and having a parallel axis of rotation.

* * * * *